Oct. 22, 1935.   J. V. CAPUTO   2,018,647
DIRECT CURRENT GENERATOR
Filed July 19, 1934   7 Sheets-Sheet 3

INVENTOR
James V. Caputo
by his attorneys
Byrnes, Stebbins & Blenko

Patented Oct. 22, 1935

2,018,647

UNITED STATES PATENT OFFICE 2,018,647

DIRECT CURRENT GENERATOR

James V. Caputo, Crafton, Pa.

Application July 19, 1934, Serial No. 736,018

26 Claims. (Cl. 171—212)

My invention relates to a direct current generator, and, in particular, to a generator adapted to supply currents of large magnitudes intermittently.

While numerous types of direct current generators are known, there is a demand for a generator capable of delivering direct currents of the order of hundreds of thousands of amperes. For certain applications, furthermore, it is desirable that the current be controlled by varying the excitation of the generator field, because it is not practical to control such large currents directly.

A field wherein the present invention has particular utility is the progressive electric welding of metal lengths in rapid succession, such as formed tube blanks having axial seam clefts therein. In order to operate profitably, the welding must proceed at a rapid rate. This requires welding currents of large magnitude. The welding current, furthermore, must be capable of being initiated and terminated as nearly instantaneously as possible, in order to start the welding operation substantially as soon as the work being welded engages the contact electrodes usually employed to deliver current thereto, and is likewise terminated substantially simultaneously with the departure of the trailing end of the work from the electrodes.

Electric generators as known heretofore have not been capable of delivering currents of the magnitude required for welding at high rates of speed, and at the same time capable of initiating and terminating the delivery of current substantially instantaneously.

In accordance with my invention, I employ a generator of the so-called homopolar type. While generators operating on this principle have been known for many years, none of them with which I am familiar incorporate the improved design or obtain the desirable results characteristic of my invention. Generally speaking, the invention comprises a homopolar generator having a magnetic circuit which is substantially entirely laminated, whereby the main field flux crossing the air gap between the stator and rotor portions varies with the exciting current almost instantaneously.

The generator of my invention, furthermore, is so constructed that the magnetic effect of the current in the generator is almost entirely neutralized and flux leakage largely prevented. This reduces the over-all reactance of the machine and causes it to respond more quickly to changes in excitation. Other novel features of the invention will become apparent during the course of the following description, which is to be taken in connection with the accompanying drawings illustrating a preferred embodiment with certain modifications. In the drawings—

Figure 1:
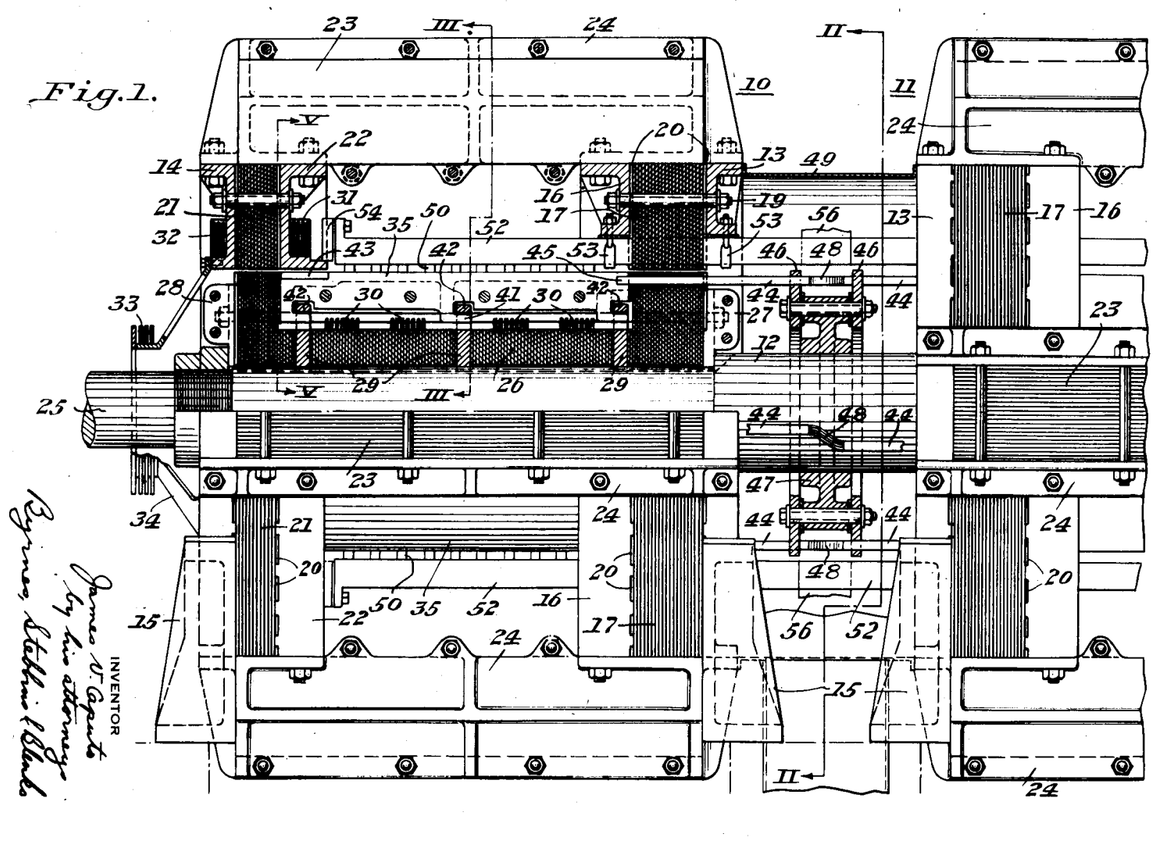
Figure 1 is a partial side elevation, partly in section, of a direct current generator embodying my invention.

Referring now in detail to the drawings, it will be seen that the generator of my invention comprises twin stationary units 10 and 11 cooperating with a single rotating system 12. The stationary units are disposed end to end as shown in Figure 1, and are identical, so that a detailed description of one will be sufficient for a clear understanding of the entire stationary structure. Stator end rings 13 and 14 are provided with supporting feet 15. The rings 13 and 14 are split horizontally and the parts insulated from each other. A ring 16 somewhat similar to that shown at 13 cooperates therewith in supporting therebetween an annular yoke 17.

The yoke 17 is composed of a plurality of segmental laminations, the ends of the segments forming each complete ring being out of electrical contact so that a complete electric circuit around the yoke is not formed. The laminations are initially assembled on and held together by tubular rivets 18 (see Figure 9), which are insulated from the laminations by suitable bushings. The yoke 17 is supported between the rings 13 and 16 by through bolts 19 which are similarly insulated therefrom. The inner faces of the rings 13 and 16 are slotted as at 20 so that they are, for the most part, spaced away from the yoke. This tends to prevent the flux traversing the yoke from passing through the rings. The radial passages formed by the slots 20 also facilitate cooling of the yoke.

Figure 2:
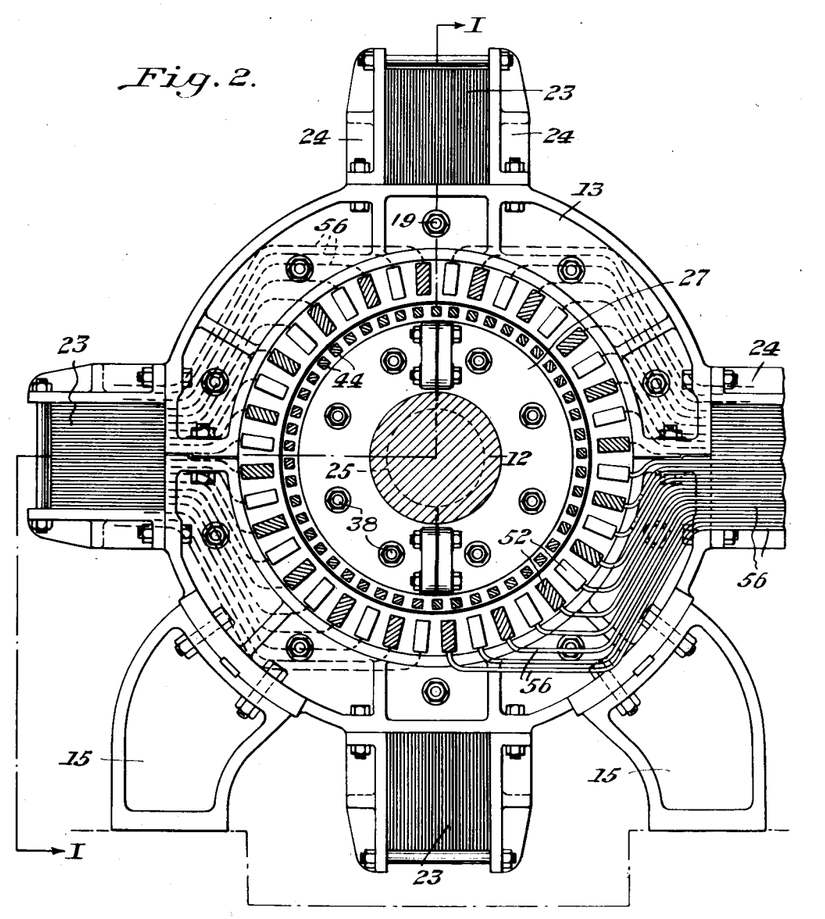
Figure 2 is a transverse sectional view along the line II—II of Figure 1, with parts omitted for the sake of clearness; line I—I of Figure 2 indicates the plane on which the sectional portion of Figure 1 is taken.

A second yoke 21 is similarly constructed and assembled between the end ring 14 and a ring 22 similar to the ring 16. A plurality of flux paths connecting the yokes 17 and 21 are provided in the form of cores 23. As shown in Figure 2, these cores are spaced 90° apart around the periphery of the yokes and are composed of laminations assembled between side frames 24 which are bolted to the rings 13, 14, 16 and 22 so that the core laminations abut the yoke laminations edge to edge.

Figure 3:
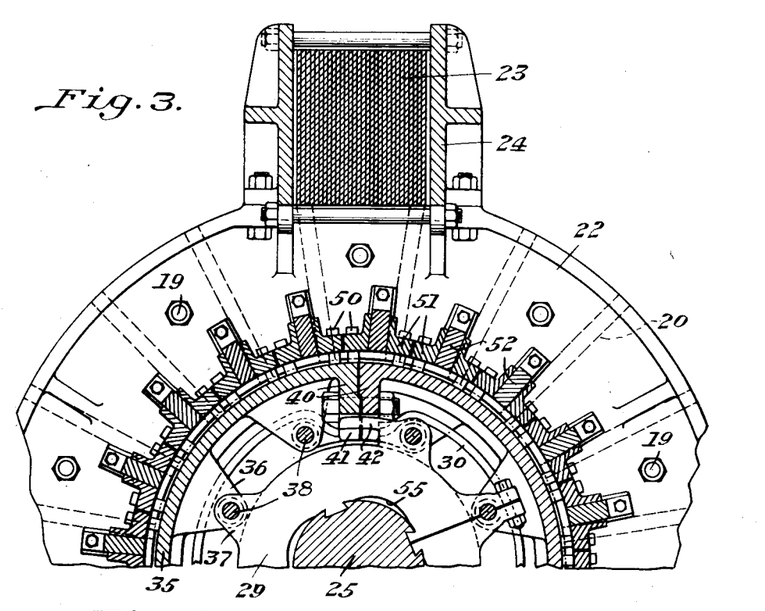
Figure 3 is a partial sectional view on the line III—III of Figure 1.

The generator armature is carried on a shaft 25 supported in suitable bearings (not shown), and comprises a laminated core 26 assembled between end rings 27 and 28. The laminations composing the core 26 are segmental, and the segments are insulated as in yokes 17 and 21. They may also be insulated from the shaft 25. The end rings 27 and 28 are sectional and the sections are insulated from each other. Supporting disks 29 are disposed at intervals between the laminations of the core 26. The disks 29 and the end rings 27 and 28 are dovetailed to the shaft 25 as shown in Figure 3. As there shown also, the disks are in sections with insulation therebetween. The disks may be seated on the core 26 instead of on the shaft.

Distributed exciting windings 30 are carried on the core 26 and are supplied with current from an external source through slip rings (not shown). A stationary winding 31 carried on a flange of the ring 22 cooperates with the windings 30, as does a similar winding 32 carried on the ring 14. A bucking winding 33 carried on the bracket 34 bolted to the ring 14 tends to prevent flux set up in the core 26 from traversing the length of the shaft 25.

Figure 4:
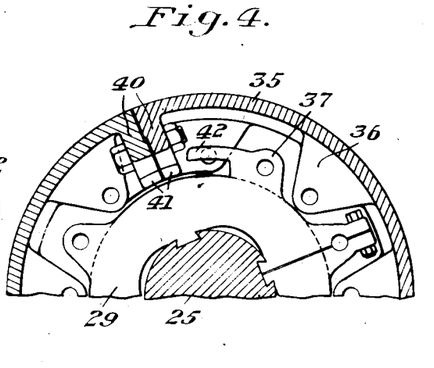
Figure 4 shows parts of Figure 3 in alternative positions.
Figure 5:
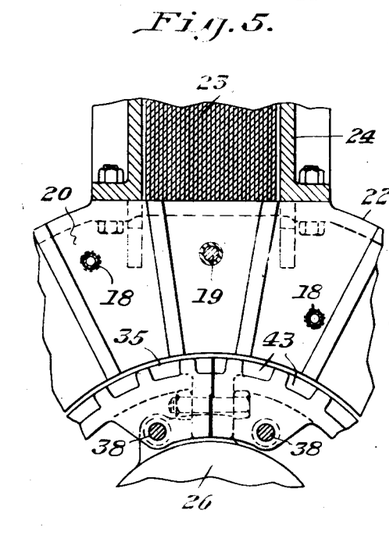
Figure 5 is a partial sectional view along the line V—V of Figure 1.

A conducting cylinder 35 is carried on the disks 29. The cylinder is formed in any suitable number of sections insulated from each other, as shown in Figure 3 and has inwardly projecting lugs 36. The disks 29 have outwardly projecting lugs 37 and the lugs 36 and 37 are so spaced that when properly disposed, as shown in Figure 4, the assembled sections of the cylinder 35 may be moved axially over the core without interference. Then, by relative rotation, the lugs 36 and 37 may be brought into alinement for the insertion of through bolts 38. The sections of the cylinder 35 have inturned flanges 40 whereby they may be bolted together. The flanges have hooked portions 41 adapted to be engaged by cooperating portions 42 on the disks 29 on relative rotation thereof, whereby the cylinder is sustained against centrifugal force and held firmly concentric on the shaft. The cylinder 35 is provided at its outer end with notches 43 for the purpose of setting up cooling air currents on rotation of the shaft 25.

Inductors 44 are imbedded in the inner portion of the core 26 and are spaced circumferentially thereof. The outer ends of the inductors are brazed into the inner end of the cylinder 35 as shown at 45. The inductors are insulated from the core laminations. The inner ends of the inductors are supported by a disk 46 carried on a spider 47 mounted on the shaft 25 between the units 10 and 11. The disk 46 is insulated from the spider 47. The inductors of the two units are connected by flexible connections 48. The space between the two units is closed by a shell 49 having an opening for the reception of cooling fluid, and openings to receive outgoing terminal leads which will be described later.

It will now be apparent that the cylinder 35 permits the removal from the armature of the current generated in the inductors 44 by means of brushes making sliding contact with the cylinder. Brushes are indicated at 50 for slidingly engaging the cylinder 35. The brushes are carried in holders 51 (see Figure 3). The brush holder may be of the usual construction wherein a spring urges the brush against the surface with which it has sliding engagement, there being also a so-called pigtail connection between the brush and the holder. The brush holders are adjustably bolted on brush arms 52 extending parallel to the axis of the shaft 25 and spaced circumferentially about the cylinder 35. The abutting surfaces of the holders and arms may be serrated to rigidly position the former when adjusted, and prevent any movement due to vibration. This also provides a greater contact area.

The inner ends of the brush arms are supported from the ring 16 by U-bolts 53. The outer ends are secured to and insulated from a ring 54 which is slidable on a flange of the ring 22 to take care of expansion and contraction of the brush arms on heating and cooling. As shown in Figure 3, the brush holders on successive arms circumferentially about the cylinder 35 are in mechanical abutment but are electrically insulated. This provides a strong assembly, but prevents circumferential currents which would otherwise be induced on variation of the main field flux.

As shown in Figure 3, the disks 29 are recessed to provide passages 55 between the core 26 and the shaft 25 for cooling fluid such as air. The laminations and end rings 27 and 28 are similarly recessed. The shoulder on the shaft 25 against which the ring 27 abuts is recessed at points adjacent the passages 55 whereby cooling fluid flows outwardly from the space enclosed by the shell 49 toward both ends of the shaft. The disks 29 are of magnetic material of substantially the same qualities as the laminations of the core 26, since the main flux passes therethrough.

The brush arms 52 extend inwardly through slots in the yoke 17, and into the space between the units 10 and 11. The portion of the arms embedded in the yoke constitutes a pole face compensating winding. The inwardly extending ends of the arms have terminal leads 56 brazed thereto which extend partially around the shaft and outwardly of the machine in a manner which will be described in detail later on. The conductors of the two units constituting the brush arms, the pole face windings, and the connections for the terminal leads are staggered in the space between units so as to prevent interference and to permit interleaving of the terminal leads of opposite polarity. The alternating sequence of the conductors circumferentially in the space between units is shown best in Figure 2, which also illustrates the arrangement of the terminal leads 56.

As shown in Figure 2, the leads comprise strap conductors which are joined to the brush arms as shown in solid and dotted lines. Adjacent leads are connected to brush arms extending from opposite ends of the machine as a whole, whereby alternate terminal leads are of opposite polarity. The excitation of the two units of the machine is such that the voltages induced in the two sets of inductors are cumulative, and the cylinders and brushes at one end of the machine have one polarity, while those at the opposite end have another polarity. In this way, complete interleaving of the terminal leads is accomplished, with the result that the reactance of the machine as a whole is less than what it would otherwise be.

Figure 6:
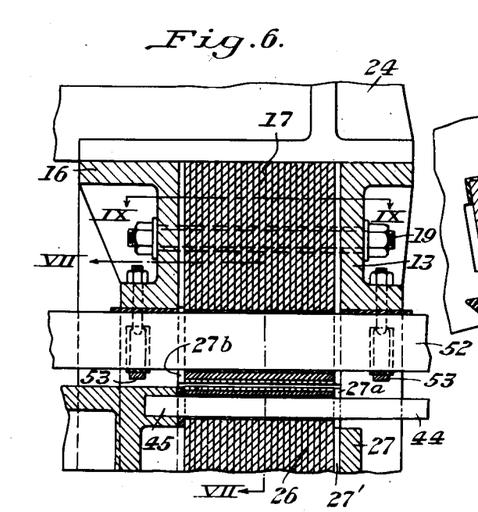
Figure 6 is a partial section showing to enlarged scale a part of the structure shown in section in Figure 1.
Figure 7:
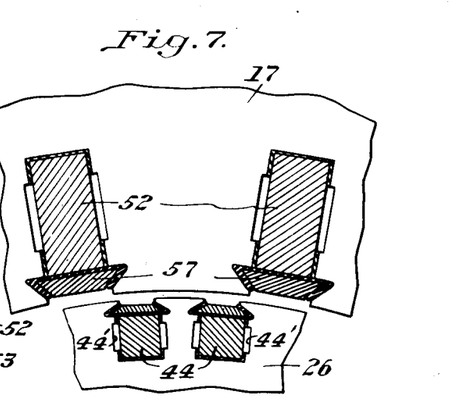
Figure 7 is a partial sectional view along the line VII—VII of Figure 6.

Figure 6 illustrates in somewhat greater detail the arrangement of the inductors 44 in the core 26 and the brush arms 52 in the yoke 17. As shown in Figure 6, the ring 27 is formed with ribs 27' abutting the laminations forming the core, providing cooling pockets therein. As shown in Figure 7, the inductors 44 are disposed in slots in the laminations forming the core 26. The sides of the slots may be recessed as shown at 44' to provide cooling ducts along the inductors and the inductors, of course, are insulated from the sides and bottom of the slots. Between the ribs 27' radial reinforcing members 27a extend outwardly between slots to prevent distortion of the end laminations. These reinforcing members are welded to the ring 27. The same construction is used on the stator yoke. Figure 7 also shows the manner in which the inductors 44 and the pole face windings are secured in the slots in the core and the yoke respectively.

Wedges 57 of magnetic material are inserted in the slots after the conductors have been placed therein, the wedges being insulated from the conductors and the rest of the magnetic circuit. Since the wedges are of magnetic material, there is very little difference between the reluctance of the air gap between the core and yoke at a point where the teeth are in alinement and a point where the slots are in alinement, and at the same time, since the wedges do not engage the teeth, the reluctance of the magnetic circuit about each individual conductor is such as to reduce the reactance thereof. Since the wedges are insulated, the flow of eddy currents as the result of induction by tooth frequency, variations of flux is reduced. The insulation of the wedges also tends to prevent the flow of current circumferentially of the laminations or variations in the main field flux, and thus cooperates with the insulation between the segmental laminations composing the core. As shown in Figure 7, the slots for receiving the conductors 52 are similar in arrangement to those containing the inductors 44.

Figure 8:
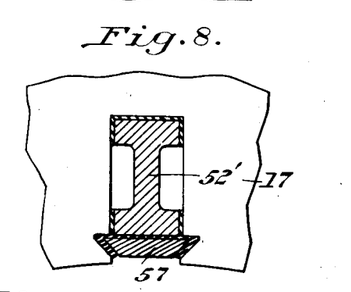
Figure 8 is a view similar to Figure 7 showing a modified construction.

Figure 8 illustrates a further modified arrangement of a conductor in its slot. The conductors 52 may have the shape shown at 52' in Figure 8, which is similar to that of an I-beam. This provides passages on both sides of the conductor between the sides of the slot and the rib of the conductor.

Figures 9, 11:
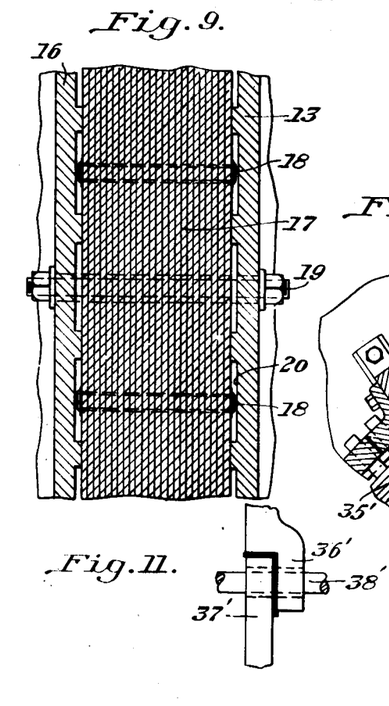
Figure 9 is a partial sectional view along the line IX—IX of Figure 6.
Figure 11 is a side view of a portion of the structure of Figure 10.
Figure 10:
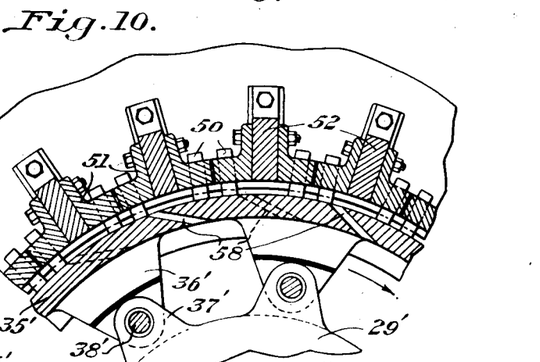
Figure 10 is a partial sectional view similar to Figure 3, showing a slightly modified form of construction.

Figures 10 and 11 illustrate a modified construction of the cylinder 35. As shown in these figures, a cylinder 35' has holes 58 bored for generally tangential direction. The holes are arranged in rows on opposite sides of the brushes 50 and are inclined toward the latter. On rotation of the cylinder 35', the holes 58 cause a flow of cooling air onto the brushes and holders on both sides of the former. Lugs 36' projecting inwardly from the cylinder 35 have their inner ends shouldered for engaging outwardly projecting lugs 37' on disks 29'. The lugs and through bolts 38' passing therethrough may be insulated from each other as shown in Figures 10 and 11. The parts shown in these figures, of course, correspond in general to similarly numbered parts in Figures 1 through 4.

Figure 12:
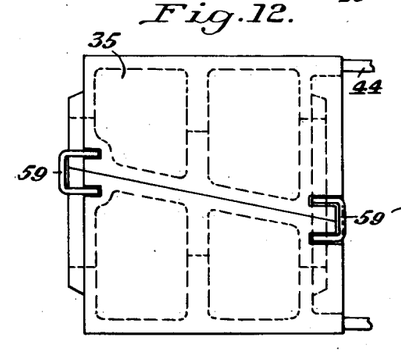
Figure 12 is a plan view of a conducting cylinder from which the current generated is taken off.
Figure 13:
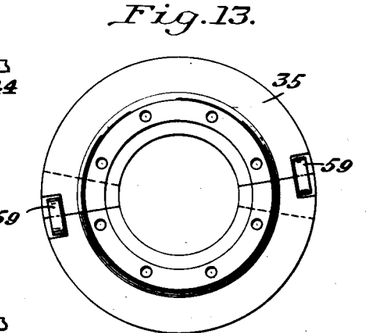
Figure 13 is an end view of the cylinder shown in Figure 12.

Figures 12 and 13 illustrate the planes of section between the portions of the cylinder 35. As will be there apparent, the sections of the cylinder have meeting surfaces on one side inclined in one direction to the axis and, on the other, inclined in the opposite direction. The line of separation between portions is thus inclined to the axis of rotation and the brush arms 52. In this way, the resistance of the machine is maintained substantially constant since the insulated gap between sections does not pass under all the brushes on any one brush holder simultaneously. The two sections of the cylinder 35 are connected by jumpers 59 which permit the flow of a limited induced current about the circumference of the cylinder when the main field flux varies. The energy stored in the magnetic field is thus dissipated in case of a reduction of the flux. The jumpers 59 are so designed that they prevent the existence of substantial voltages between the sections of the cylinder, and, at the same time, prevent the flow of sufficient current circumferentially of the cylinder to delay any change in the variation of the flux in the core. Figures 1 and 12 show how the cylinder is reinforced by a central circumferential rib.

Figure 14:
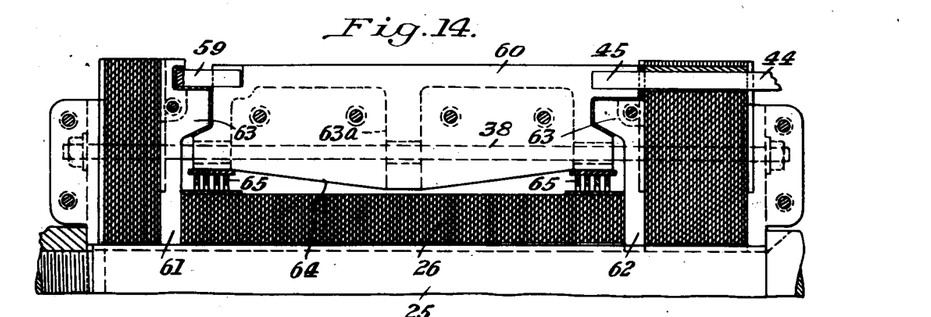
Figure 14 is a sectional view similar to a portion of Figure 1, showing a partial modification of the structure of the latter.

Figure 14 illustrates a modified form of core and cylinder construction. The cylinder shown at 60 is held in place by rings 61 and 62 having shoulders 63 engaging abutting shoulders formed on the cylinder. A central rib 63a and circumferentially spaced longitudinal ribs 64 stiffen the ring against deflection by centrifugal force, and also provide additional radiating surface. The rings 61 and 62 are of magnetic material to facilitate the passage therethrough of the main flux. Distributed field windings 65 are disposed on the core 26 adjacent the ends of the cylinder. Through bolts 38 extend through the core 26 and the cylinder as in the construction shown in Figure 1. The sections of the cylinder 60 are insulated from the core and the rings 61 and 62.

Conducting cylinders constructed in the form shown at 35 and 60 are of material having a conductivity such as that of copper. Since the greater portion of the full load current must flow axially of the cylinder for a portion of its length at least, in another form of the cylinder shown in Figure 15, a material having a higher resistance is employed, to limit the flow of circulating current circumferentially of the cylinder. In this type of construction, the inductors are connected to the interior of the cylinder at points spaced therealong so that a greater area of the cylinder wall is utilized in transmitting the load current from the inductor to the brushes, and the section of the cylinder wall is not relied on to carry the current longitudinally thereof.

Figure 15:
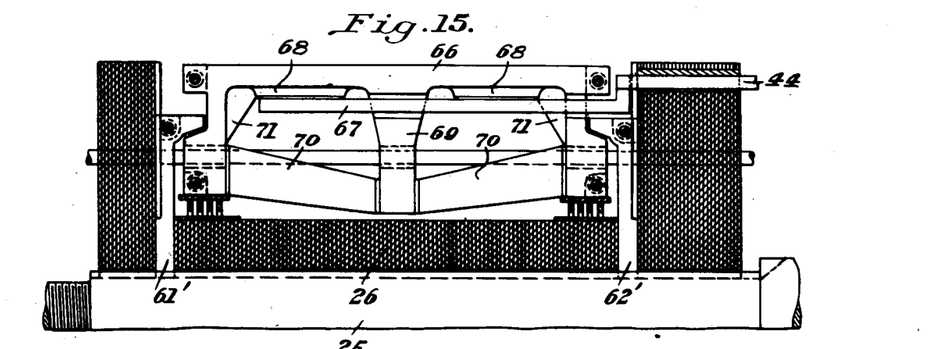
Figure 15 is a view similar to Figure 14, showing a further modification.

Referring now to Figure 15, the cylinder 66 is carried on the core 26 by rings 61' and 62' as in the case of the modification of Figure 14. The inductors 44, however, instead of being connected to the inner end of the cylinder, have connections 67 projecting into the interior of the cylinder and brazed to spaced lugs 68 therein. A central circumferential rib 69 reinforces the cylinder, together with struts 70, the latter being welded to the central rib and the end flanges of the cylinder. The latter are bored to receive the connection 67 and through bolts 38, the bolts being insulated from the cylinder at all points. Reinforcing ribs 71 further strengthen the cylinder and set up cooling air currents on rotation of the shaft.

Figure 16:
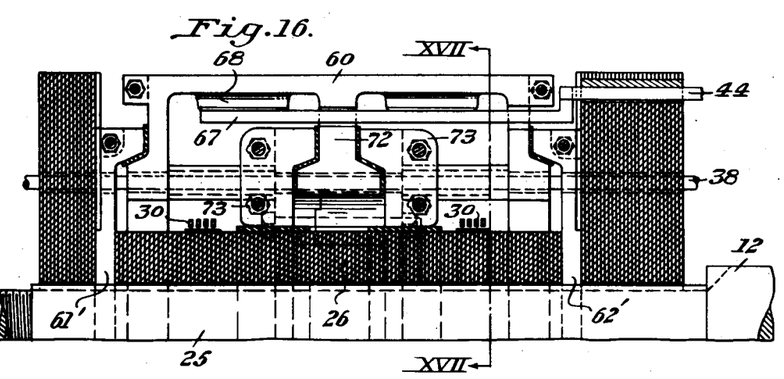
Figure 16 is a view similar to Figure 14, showing a still further modification.

Figure 16 shows a further modified form of cylinder construction which is quite similar to that of Figure 15, except that the central rib 72 is held in place by shoulder clamping rings 73 similar to the rings 61' and 62'.

Figures 17, 19:
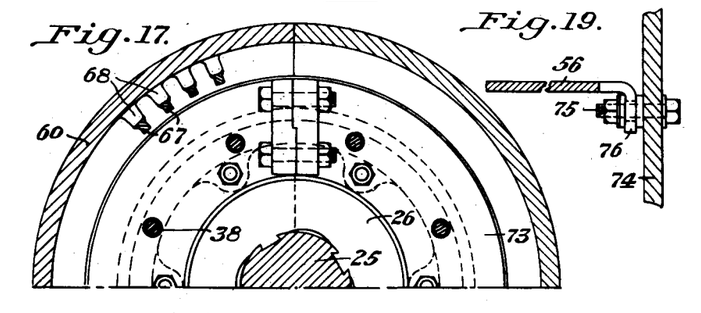
Figure 17 is a sectional view along the line XVII—XVII of Figure 16.
Figure 19 is a partial sectional view along the line XIX—XIX of Figure 18.

Figure 17 illustrates the attachment of the connections 67 to the lugs 68.

Figure 18:
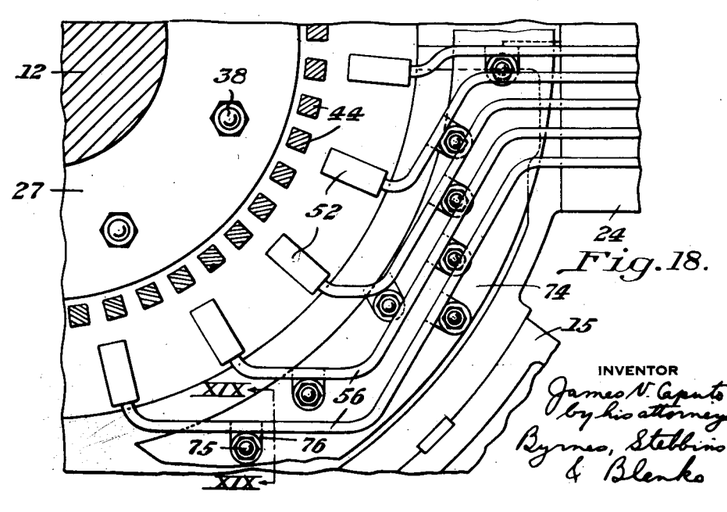
Figure 18 is a partial sectional view similar to Figure 2, with parts omitted, illustrating a further detail of construction.

Figures 18 and 19 show a further detail of construction. In order to support the terminal leads 56, a ring 74 is attached to the ring 13 in any convenient manner and bored to receive bolts 75 passing through lugs 76 welded to the edges of the terminal leads 56. In this way, the leads are rigidly supported and contact therebetween resulting from sagging is prevented.

Figures 20, 21:
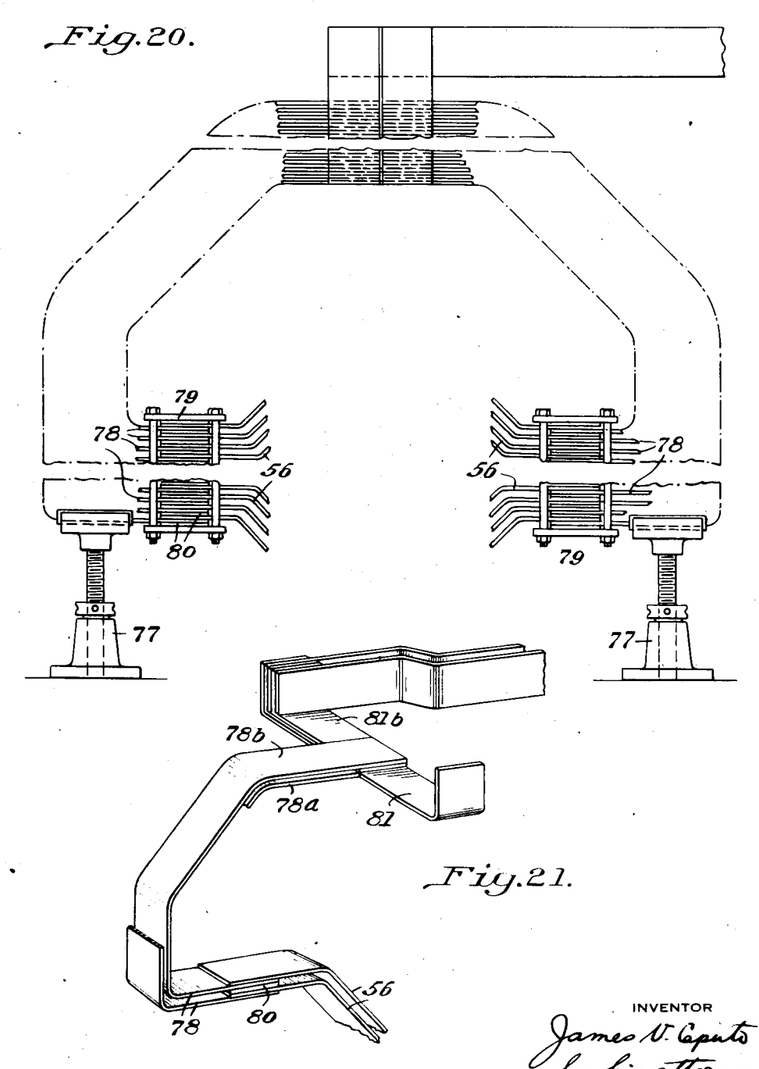
Figure 20 is a diagram illustrating the arrangement of the terminal leads extending from the machine to its load.
Figure 21 is a perspective view showing disposition of a few of the terminal conductors indicated in Figure 20.

Figure 20 illustrates diagrammatically how the interleaved terminal leads 56 of alternately opposite polarity are brought out on opposite sides of the machine, around the circumference thereof and to a common point for connection to the load. The arrangement of the conductors is also further shown in Figure 21. Jacks 77 are disposed beneath the assembled groups of outgoing leads 78 and suitably anchored to give them further mechanical support. The leads 78 are secured to the leads 56 by bolts and clamping plates 79, suitable insulation being disposed between adjacent conductors as shown at 80.

The interleaving of the conductors may be terminated at the common point where they all come together, or may be continued to a point adjacent the load if desired. As shown in Figure 21, the conductors 78 extend upwardly and around into edge contact with cross conductors 81. The lead 78a, it will be observed, has end to edge engagement with the cross conductors 81. The conductor 78b has edge to end engagement with a cross conductor 81b, which extends in only one direction from the conductor 78b. The contacting surfaces of the conductors are brazed or welded. If successive conductors 78a, 78b, etc. are connected to cross conductors extending in both directions therefrom such as the conductor 81b, the interleaving of these leads may be continued to any desired extent. If leads 78a and 78b are connected to conductors such as 81b extending toward only one side thereof, the conductors of similar polarity may be grouped together and the interleaving of conductors terminated.

It will be apparent from the foregoing description that when the generator shaft 25 is driven by any convenient power source, the inductors 44 will cut the flux crossing the air gap between the yoke 17 and the core 26. If the terminal leads are connected to a complete circuit, current will flow from the inductors to the cylinder at one end, through the brushes, brush holders, brush arms, pole face windings and terminal leads to the load and back through similar parts at the other end of the machine in reverse order. Now that the mechanical structure has been disclosed completely, it is desirable to mention certain characteristics and properties of the complete device as well as a number of advantageous features of the invention.

It will be understood, in the first place, that while insulation has been shown at a number of points, it will also be used at any other points where it is desirable to prevent short circuiting or undesired current flow. All the circular conducting members embracing any portion of the main field flux are sectional, the portions being separated by insulation, preventing the flow of induced current on variation in the main field flux. The collecting cylinders 35, of course, have jumpers connecting the portions thereof to permit the flow of a limited amount of current. This feature, together with the laminated structure of the entire magnetic circuit, causes the main flux to respond very quickly to excitation changes whereby voltage generated may be varied almost instantaneously.

The frame members supporting the laminated stator cores may be of non-magnetic material if desired, to further concentrate the flux in the laminations. Connecting and tie bolts are insulated to prevent the flow of induced circulating currents. The construction of the machine is relatively simple both as to the manufacture of the various component parts, and the assembly and dismantling thereof, without, furthermore, presenting any obstructions to accessibility of the parts for cleaning, inspection, repair or renewal.

Cooling air is supplied to the central shell 49 and flows radially and axially of the machine in both directions through the various passages which have been mentioned, to maintain all parts at safe operating temperatures.

The pole face windings compensate the magnetic effect of the current in the inductors and thus prevent distortion of the main field. The disposition of the brush holders in close relation to the collecting cylinders 35, furthermore, tends to further reduce the reactance of the machine because the magnetic effects of the currents in opposite directions are almost entirely neutralized. As will be seen from Figures 1 through 3, the brush arms constitute substantially a complete cage embracing the collecting cylinders. The arrangement of the brushes is such as to limit to a minimum the reaction of the current in the collector cylinders on the main flux.

It is well known that the current in a wide flat conductor will follow the direction of a lead conductor spaced a short distance therefrom if there is any variation in the magnitude of the current (The Proximity Effect, Bennett, A. I. E. E. Transactions V51, 1932). This result is further aided by the interleaving of the terminal leads. The resistance of the numerous parallel paths through the generator are substantially equal except for the differences in the length of the terminal leads which are inevitable. These may be compensated, however, by inserting sections such as 78, of an alloy having a higher resistance than the conductor used for the rest of the leads in those leads having the shorter lengths, to equalize their resistance with that of the longer leads.

The brush arms and inductors are arranged to permit slight elongation or contraction on heating and cooling, without exerting any material stress in other parts of the apparatus. A large amount of radiating surface is provided in all parts that are apt to become heated, and the rotating parts are designed so as to set up cooling currents in normal operation. The brush holders are adjustable so as to take up any clearance due to wear, and at the same time are mounted in a rigid supporting structure which is electrically discontinuous to prevent the induction of eddy currents on variations in the main field flux.

The machine is well adapted to compounding, since the brush arms may readily be spiralled to give the effect of a part turn about the core. The core laminations are spaced from the supporting shaft in a large portion of their periphery. This further tends to confine the active flux to the laminated circuit and prevent it from passing through the shaft.

Since the machine is characterized by low inductance, by virtue of the details of construction already mentioned, the time required for it to build up its output from zero to full load is very short, since this time depends on the ratio of inductances of the various circuits to the resistance thereof.

The fact that the current collecting cylinders are separate longitudinally does not introduce any arcing or sparking of the brushes, since some of the brushes on each brush arm are always in engagement with a cylinder on one side of the split, and rotation of the collector cylinder merely means a gradual transfer of the current from one brush to another or from one portion of a brush to another portion thereof. There is substantially no change in the resistance of the parallel paths through the machine on rotation of the shaft. The jumpers connecting the sections of the cylinders, furthermore, prevent arcing, and the existence of high voltages between cylinder sections.

Since the current drawn from a generator of the type described, by a load such as a welding apparatus, for which the generator was designed particularly, is of constantly varying magnitude, even during the active portions of an operating cycle, any considerable inductance in the machine under such varying conditions would be highly undesirable, even though direct current is involved. It is for this reason that I have taken particular pains to provide a construction wherein the inductance opposing current variations is a minimum. I thus take advantage of a characteristic of the load in improving the construction of the machine to give it a lower impedance, etc.

From the foregoing description and explanation, it will be apparent that the invention embodies numerous features of advantage over similar devices as known heretofore. The reactance of the machine is such that it is possible to initiate and terminate welding currents of large magnitude in such short intervals of time that even rapidly moving elements being progressively welded, such as open seam tube blanks, travel only a very short distance between the opening or closing of the generator field circuit and the termination and starting of the normal flow of welding current.

Although I have illustrated and described herein but one preferred embodiment of the invention with certain modifications thereof, it will be apparent that many changes in the construction described may be made without departing either from the spirit of the invention or the scope of the appended claims.

I claim:

1. A dynamo electric machine comprising a pair of yokes spaced apart axially, a core supported for rotation within said yokes, means for inducing magnetic flux in said core and yokes, said yokes being composed of laminations assembled between frame rings, said laminations and rings being discontinuous circumferentially, with electrical insulation between separated portions.

2. A dynamo electric machine comprising a yoke, a shaft extending axially of the yoke, a core mounted on the shaft for rotation within the yoke, inductors on the core, a current collecting cylinder in conducting engagement with said inductors, and means mounted on the shaft for supporting said cylinder.

3. The apparatus defined by claim 2, wherein said cylinder supporting means comprises a plurality of disks having outwardly extending lugs adapted to engage lugs projecting inwardly from said cylinder, the lugs on the disks and cylinder being spaced apart whereby on partial rotation of the cylinder relative to the disks, it may be moved axially thereof.

4. A dynamo electric machine comprising a yoke, a core mounted for rotation therein, a current collecting cylinder rotating with said core, brush arms extending axially of the yoke, brushes on said arms engaging said cylinder, and angularly disposed bores through the wall of said cylinder for throwing cooling fluid jets against said brushes on rotation.

5. A dynamo electric machine comprising a yoke, a core mounted for rotation in said yoke, a current collecting cylinder rotating with said core, brush arms extending along said cylinder and having brushes thereon in conducting engagement with said cylinder, said brush arms extending through said yoke, thereby constituting a pole face compensating winding.

6. The apparatus defined by claim 5, characterized by terminal leads connected to the ends of said brush arms projecting through said yoke, said leads extending radially and circumferentially of said yoke.

7. A dynamo electric machine comprising a yoke, a core mounted for rotation therein, inductors on the core, a current collecting cylinder rotating with the core and in electrical conducting engagement with said inductors, brush arms cooperating with said cylinder, and means for supporting the ends of the brush arms for longitudinal movement.

8. A dynamo electric machine comprising a pair of spaced yokes, cores mounted for rotation therein, inductors on said cores, current collecting cylinders mounted for rotation with said cores, brush arms cooperating with said cylinders and extending into the space between said yokes, the brush arms for the two yokes alternating circumferentially in the space therebetween.

9. In a dynamo electric machine, current collecting means spaced circumferentially thereof, terminal leads extending from said means substantially to a common point and being of different lengths, and means inserted in said leads for equalizing the resistance of the shorter leads with that of the longer leads.

10. In a dynamo electric machine having a main magnetic field member composed of magnetic sheets and conducting members embracing said field member, at least partially, said sheets and members being discontinuous circumferentially, with the separated portions thereof electrically insulated from each other whereby to limit eddy current losses and the time elapsing between variations in the magneto-motive force exerted upon said field member and the resulting changes in the flux therethrough.

11. The apparatus defined by claim 10, characterized by the provision of conducting means connecting the sections of certain of said members to limit the induced voltage therebetween.

12. In a dynamo electric machine, a laminated magnetic field member, and conducting members embracing said field member at least partially, said members being discontinuous to prevent the circulation of current therearound.

13. The apparatus defined in claim 12, characterized by means on certain of said members effective to conduct a limited current circulating therearound, to limit the induced voltage between portions thereof.

14. In a dynamo electric machine, terminal leads extending radially therefrom, connections extending at an angle to said leads, load circuit conductors attached to said connections, and means for supporting said connections independently of the machine whereby stresses set up in the load circuit conductors are absorbed before being communicated to the machine and said terminal leads.

15. In a dynamo electric machine, a stator, a rotor mounted for rotation therein, brush arms extending generally axially of the stator and rotor and spaced circumferentially thereof, and brush holders on said arms, the brush holders of adjacent arms being in mechanical abutment but electrically insulated from each other.

16. A dynamo electric machine comprising a yoke, a shaft disposed co-axially of said yoke, a core on said shaft, the shaft extending beyond the core, means for inducing magnetic flux traversing said yoke and core, and a bucking winding disposed closely adjacent the shaft at one end of the core for preventing stray flux in the portion of the shaft extending beyond the core.

17. In a dynamo electric machine, a yoke, a core mounted for rotation therein, inductors on said core, brush-supporting arms spaced circumferentially of the core and extending substantially the full length thereof, a portion of each of said arms being embedded in said yoke to form a pole-face winding, said brush arms being effective to collect and deliver current induced in said inductors.

18. A dynamo electric machine comprising a laminated yoke, a core supported for rotation in said yoke, inductors on said core, a current collecting cylinder on said core connected to said inductors, said cylinder being divided into sections, along a longitudinally extending plane, said sections being electrically insulated from each other, and means for causing flux to flow axially through the cylinder.

19. The apparatus defined by claim 18, wherein the planes of contact between the sections of said cylinder are at an angle to the axis thereof.

20. The apparatus defined by claim 18 characterized by electrically conducting means connecting said sections.

21. The apparatus defined by claim 18 characterized by said cylinder being composed of material having an electrical resistance greater than that of copper.

22. The apparatus defined by claim 18 characterized by said cylinder being composed of material having an electrical resistance greater than that of copper, and by said inductors being connected to the cylinder at points on the interior and spaced axially thereof.

23. A dynamo electric machine comprising a pair of yokes spaced apart axially, a shell extending around the space therebetween to form a chamber for cooling fluid, cores mounted for rotation in said yokes, inductors on said cores, current-collecting means engaging said inductors, said means including brush-holder arms extending axially of said yokes and embedded therein for at least a portion of the length to form a pole-face winding.

24. In a dynamo electric machine, a plurality of terminal leads extending radially therefrom, said radially extending leads being bent circumferentially of the machine toward one of a plurality of points adjacent the exterior thereof, all said leads extending radially from the machine substantially at said points.

25. In a homopolar generator, a yoke, a core mounted for rotation therein, a current-collecting cylinder rotating with said core, brush arms extending axially of the yoke, a portion of each of said arms being embedded in said yoke to form a pole-face winding, said arms and pole-face windings being circumferentially spaced and substantially equidistant radially from the axis of said yoke.

26. In a dynamo electric machine, means for generating a relatively low voltage, high amperage current, including means for producing a unidirectional field, having an annular air gap, an inductor traversing said gap, brush arms extending axially of the yoke, a portion of each of said arms being embedded in said yoke, said brush arms being connected in multiple to the load.

JAMES V. CAPUTO.